W. TURNWALD.
AUXILIARY CLEARANCE VALVE.
APPLICATION FILED JAN. 22, 1916.

1,390,239.  Patented Sept. 6, 1921.

WITNESSES:
Max Hofmann

INVENTOR.
Wolfgang Turnwald
ATTORNEY.

UNITED STATES PATENT OFFICE.

WOLFGANG TURNWALD, OF SYRACUSE, NEW YORK, ASSIGNOR TO STUMPF UNA-FLOW ENGINE COMPANY, A CORPORATION OF NEW YORK.

AUXILIARY-CLEARANCE VALVE.

1,390,239.    Specification of Letters Patent.    Patented Sept. 6, 1921.

Application filed January 22, 1916. Serial No. 73,507.

*To all whom it may concern:*

Be it known that I, WOLFGANG TURNWALD, a subject of the Emperor of Austria, residing at Syracuse, in the county of Onondaga, State of New York, have invented a new and useful Improvement in Auxiliary-Clearance Valves, of which the following is a specification.

My invention relates to valve controlling mechanism. The object of the invention is to provide improvements in the method of and means for operating and controlling steam valves and is especially applicable to the operation and control of auxiliary clearance valves in una-flow engines or other engines requiring auxiliary clearance.

Una-flow engines, operating condensing when there is a liability to a break in the vacuum, or if they have to run at times non-condensing, require an auxiliary clearance and a valve in the connecting passage between this auxiliary clearance and the regular clearance of the engine.

It is often desirable that these valves should operate automatically; that is to close and remain closed when the engine is exhausting into the vacuum; and automatically to open and remain open in case the vacuum is broken, or the engine exhausts against back pressure.

The common way of securing this is to provide a puppet valve adapted to open to an auxiliary clearance space and a piston in a vacuum cylinder connected to the condenser, to force it shut. This works very well when there is a high vacuum or when there is no vacuum, but it can be readily appreciated that there must necessarily be some partial vacuum which will practically balance the pressure on the valve, and when that condition occurs, the valve being in balance, a fluttering is caused, which is objectionable.

The object therefore of this invention is to provide a mechanism which will not only open the valve, but will lock it open, and which will permit of the use of a smaller vacuum piston than would ordinarily be required.

Referring to the drawings, which illustrate merely by way of example, suitable means for the embodiment of my invention:—

Similar numerals refer to similar parts throughout the several views.

Figure 1:
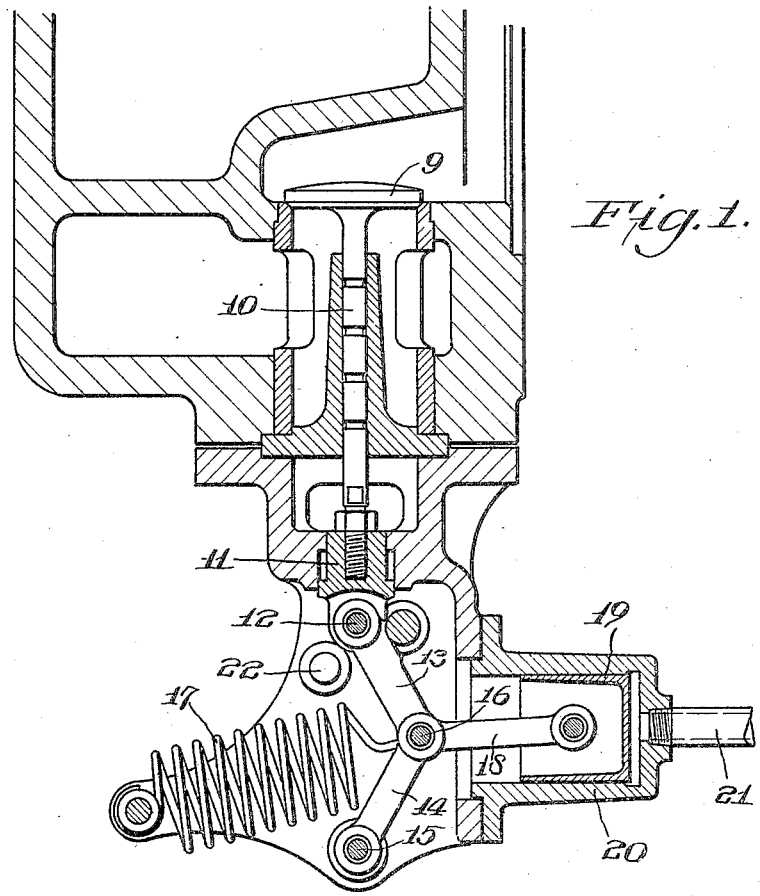
Figure 1 is a view in section showing toggle mechanism operating between the spring and vacuum piston for operating the valve.
Figure 2:
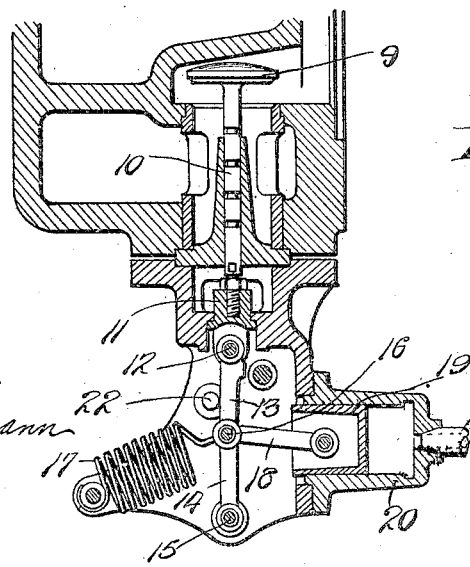
Fig. 2 is a similar view, on a reduced scale, showing the valve locked in the open position.

In the example shown, the auxiliary puppet valve 9 is connected by spindle 10 with the sliding block 11, pivotally secured at 12 to one element 13 of a toggle mechanism, the other element 14 is secured to the fixed pivot 15. To the knuckle pivot 16 is connected one end of spring 17 and the rod 18 connected with the vacuum piston 19. Piston 19 operates in cylinder 20 which is in communication with the exhaust through pipe 21. The mechanism is shown in the position in which the engine is running condensing, the vacuum pulling the piston 19 into the right hand position against the tension of spring 17, thereby maintaining valve 9 in the closed position, as shown in Fig. 1. Upon the break of the vacuum in the exhaust, or a predetermined drop in the vacuum pressure, the piston is released to respond to the pull of spring 17, the toggle is thrown to the left, just over the dead center, with element 13 engaging stop 22 as shown in Fig. 2. In this position the valve 9 is held open and is locked in said open position, and can only be closed by pulling the toggle over the dead center by the movement of the piston 19 in response to the vacuum of the exhaust.

It will also be noted that the spring 17 is so arranged as to the direction of its pull, that it increases the force acting against the vacuum piston as the spring acts, instead of decreasing it as it would be if connected directly in line. This is accomplished by the increased leverage due to the angle of pull of one toggle lever.

What I claim is:—

1. The combination with a steam engine cylinder, of a closed clearance chamber communicating therewith, a valve controlling the communication between the cylinder and the chamber, means operated by the vacuum in the exhaust to close said valve when sufficient vacuum exists and means automatically to open and rigidly lock said valve in the wide open position upon a predetermined drop in the vacuum pressure.

2. The combination with a steam engine cylinder, of a closed clearance chamber communicating therewith, a valve controlling the communication between the cylinder and the chamber, means operated by the vacuum in the exhaust to close said valve when vacuum exists and means automatically to open and rigidly lock said valve in the open position upon predetermined drop in the vacuum pressure, said opening means increasing in power toward the end of its opening movement.

3. The combination with a steam engine cylinder, of a closed clearance chamber communicating therewith, a valve controlling the communication between the cylinder and the chamber, means controlled by the vacuum in the exhaust to close said valve when vacuum exists and means comprising a spring actuated toggle, adapted to move slightly over the dead center, to open and lock said valve in the open position upon predetermined drop in the vacuum pressure.

4. The combination with a steam engine cylinder, of a closed clearance chamber communicating therewith, a valve controlling the communication between the cylinder and the chamber, means controlled by the vacuum in the exhaust to close said valve when vacuum exists and means comprising a spring actuated toggle, adapted to move slightly over the dead center, to open and lock said valve in the open position upon predetermined drop in the vacuum pressure, the angle of pull of the spring upon one toggle lever being such as to increase the force exerted on the valve as the spring acts.

WOLFGANG TURNWALD.

Witnesses:
　WILFRED A. REVILLE,
　WM. C. BROWN.